(12) United States Patent
Ashour et al.

(10) Patent No.: US 11,670,169 B2
(45) Date of Patent: Jun. 6, 2023

(54) SYSTEMS AND METHODS FOR DISTRIBUTED COOPERATIVE LOCALIZATION IN A CONNECTED VEHICULAR PLATFORM

(71) Applicant: Toyota Motor Engineering & Manufacturing North America, Inc., Plano, TX (US)

(72) Inventors: Mahmoud Ashour, Mountain View, CA (US); Rui Guo, San Jose, CA (US); Ahmed H. Sakr, Mountain View, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 430 days.

(21) Appl. No.: 16/928,514

(22) Filed: Jul. 14, 2020

(65) Prior Publication Data
US 2022/0028263 A1 Jan. 27, 2022

(51) Int. Cl.
*G08G 1/0968* (2006.01)
*H04W 4/46* (2018.01)
(Continued)

(52) U.S. Cl.
CPC ............ *G08G 1/0968* (2013.01); *H04Q 9/00* (2013.01); *H04W 4/46* (2018.02); *G01S 13/931* (2013.01);
(Continued)

(58) Field of Classification Search
CPC .................................................. G08F 1/0968
See application file for complete search history.

(56) References Cited

U.S. PATENT DOCUMENTS 6,801,138 B2 * 10/2004 Koike ...................... G01S 5/04
340/902
10,490,068 B2 * 11/2019 Nascimento ............ H04W 4/46
(Continued)

OTHER PUBLICATIONS

Demetriou et al., "CoDrive: Improving Automobile Positioning via Collaborative Driving," 2019, found at https://spiral.imperial.ac.uk/bitstream/10044/1/64238/2/demetriouInfocom18.pdf.
(Continued)

*Primary Examiner* — Michael A Berns
(74) *Attorney, Agent, or Firm* — Christopher G. Darrow; Darrow Mustafa PC

(57) ABSTRACT

Systems and methods for distributed cooperative localization in a connected vehicular platform are disclosed herein. At a first sensor-rich vehicle, one embodiment receives, from a second sensor-rich vehicle via direct vehicle-to-vehicle (V2V) communication, an estimated location of the first sensor-rich vehicle and an associated confidence level; estimates a location of the second sensor-rich vehicle based on first sensor data and assigns a confidence level to the estimated location; transmits to the second sensor-rich vehicle via direct V2V communication, the estimated location of the second sensor-rich vehicle and the assigned confidence level; accepts, based on communication between the first and second sensor-rich vehicles and predetermined acceptance criteria, an assignment to perform localization for a legacy vehicle; estimates a location of the legacy vehicle based on second sensor data; and transmits, to the legacy vehicle, the estimated location of the legacy vehicle.

20 Claims, 5 Drawing Sheets

(51) Int. Cl.
*H04Q 9/00* (2006.01)
*G01S 19/03* (2010.01)
*G01S 13/931* (2020.01)

(52) U.S. Cl.
CPC ....... *G01S 19/03* (2013.01); *G01S 2013/9316* (2020.01); *G01S 2013/9323* (2020.01); *G01S 2013/9324* (2020.01); *H04Q 2209/40* (2013.01)

(56) References Cited

U.S. PATENT DOCUMENTS

| | | | |
|---|---|---|---|
| 10,652,896 B2* | 5/2020 | Belagal Math | H04L 47/25 |
| 10,755,575 B2* | 8/2020 | Johnston | G05D 1/0295 |
| 2018/0122234 A1 | 5/2018 | Nascimento et al. | |
| 2019/0159211 A1 | 5/2019 | Math et al. | |
| 2020/0074862 A1 | 3/2020 | Johnston et al. | |
| 2022/0026566 A1* | 1/2022 | Guo | G01S 7/003 |

OTHER PUBLICATIONS

Roumeliotis et al., "Distributed Multi-Robot Localization," 2000, found at http://citeseerx.ist.psu.edu/viewdoc/download?doi=10.1.1.93.5133&rep=rep1&type=pdf.

Fenwick et al., "Cooperative Concurrent Mapping and Localization," 2002, found at http://citeseerx.ist.psu.edu/viewdoc/download?doi=10.1.1.6.9835&rep=rep1&type=pdf.

Hult et al., "Coordination of Cooperative Autonomous Vehicles," Signal Processing for Smart Vehicle Technologies, 2016, found at http://www.gabrieldecampos.com/Documents/Publications/SPM'16_safe.pdf.

Indelman et al., "Distributed Vision-Aided Cooperative Localization and Navigation Based on Three-View Geometry," Elsevier, 2012, found at https://www.researchgate.net/profile/Pini_Gurfil/publication/235427035_Distributed_Vision-Aided_Cooperative_Localization_and_Navigation_Based_on_Three-View_Geometry/links/59f04105458515c3cc4380c5/Distributed-Vision-Aided-Cooperative-Localization-and-Navigation-Based-on-Three-View-Geometry.pdf.

Knuth et al., "Distributed Collaborative Localization of Multiple Vehicles from Relative Pose Measurements," 2009, found at https://www.researchgate.net/profile/P_Barooah/publication/224106352_Distributed_collaborative_localization_of_multiple_vehicles_from_relative_pose_measurements/links/5753bb7e08ae02ac127b1beb/Distributed-collaborative-localization-of-multiple-vehicles-from-relative-pose-measurements.pdf.

Knuth et al., "Collaborative 3D Localization of Robots from Relative Pose Measurements Using Gradient Descent on Manifolds," 2012, found at https://www.researchgate.net/profile/P_Barooah/publication/254040708_Collaborative_3D_localization_of_robots_from_relative_pose_measurements_using_gradient_descent_on_manifolds/links/542020a10cf203f155c2a9b1/Collaborative-3D-localization-of-robots-from-relative-pose-measurements-using-gradient-descent-on-manifolds.pdf.

Lassoued et al., "Cooperative Localization of Vehicles Sharing GNSS Pseudoranges Corrections with No Base Station Using Set Inversion," 2016, found at https://hal.archives-ouvertes.fr/hal-01369824/document.

Roumeliotis et al., Synergetic Localization for Groups of Mobile Robots, 2000, found at http://biorobotics.ri.cmu.edu/papers/sbp_papers/kalman/roumeliotis_local_group.pdf.

Wymeersch et al., "Challenges for Cooperative ITS: Improving Road Safety Through the Integration of Wireless Communications, Control, and Positioning," 2015, Abstract found at https://ieeexplore.ieee.org/abstract/document/7069408.

* cited by examiner

SYSTEMS AND METHODS FOR DISTRIBUTED COOPERATIVE LOCALIZATION IN A CONNECTED VEHICULAR PLATFORM

TECHNICAL FIELD

The subject matter described herein generally relates to vehicles and, more particularly, to systems and methods for distributed cooperative localization in a connected vehicular platform.

BACKGROUND

Localization has been a central focus of automotive research for decades. The Global Positioning System (GPS) is a cost-efficient way of vehicle navigation that provides a reasonable localization accuracy at a low monetary cost. However, the accuracy of GPS can deteriorate severely in urban canyons where there is no clear line of sight to multiple satellites providing the navigation service. Moreover, a multitude of future applications of autonomous driving require extremely accurate localization, and GPS does not meet those requirements. Cooperative localization among vehicles has been studied in the literature as a potential solution, but conventional approaches focus mostly on centralized architectures in which a centralized entity or third party (e.g., an edge node or a cloud server) coordinates the interactions among vehicles. This centralized entity requires powerful computational capabilities, aggregates global information regarding the traffic scene, and depends on seamless communication with all participating vehicles.

SUMMARY

An example of a system for distributed cooperative localization in a connected vehicular platform is presented herein. The system comprises one or more sensors installed on a first sensor-rich vehicle, one or more processors in the first sensor-rich vehicle, and a memory in the first sensor-rich vehicle communicably coupled to the one or more processors. The memory stores a sensor-rich-vehicle interaction module including instructions that when executed by the one or more processors cause the one or more processors to receive, from a second sensor-rich vehicle with which the first sensor-rich vehicle is in direct vehicle-to-vehicle (V2V) communication, an estimated location of the first sensor-rich vehicle and a confidence level associated with the estimated location of the first sensor-rich vehicle. The sensor-rich-vehicle interaction module also includes instructions that when executed by the one or more processors cause the one or more processors to estimate a location of the second sensor-rich vehicle based on first sensor data from the one or more sensors and assign a confidence level to the estimated location of the second sensor-rich vehicle. The sensor-rich-vehicle interaction module also includes instructions that when executed by the one or more processors cause the one or more processors to transmit, to the second sensor-rich vehicle via direct V2V communication, the estimated location of the second sensor-rich vehicle and the confidence level assigned to the estimated location of the second sensor-rich vehicle. The memory also includes a legacy-vehicle interaction module including instructions that when executed by the one or more processors cause the one or more processors to accept, based on communication between the first and second sensor-rich vehicles and predetermined acceptance criteria, an assignment to perform localization for a legacy vehicle. The legacy-vehicle interaction module also includes instructions that when executed by the one or more processors cause the one or more processors to estimate a location of the legacy vehicle based on second sensor data from the one or more sensors. The legacy-vehicle interaction module also includes instructions that when executed by the one or more processors cause the one or more processors to transmit, to the legacy vehicle, the estimated location of the legacy vehicle.

Another embodiment is a non-transitory computer-readable medium for distributed cooperative localization in a connected vehicular platform and storing instructions that when executed by one or more processors cause the one or more processors to receive, at a first sensor-rich vehicle from a second sensor-rich vehicle with which the first sensor-rich vehicle is in direct vehicle-to-vehicle (V2V) communication, an estimated location of the first sensor-rich vehicle and a confidence level associated with the estimated location of the first sensor-rich vehicle. The instructions also cause the one or more processors to estimate, at the first sensor-rich vehicle, a location of the second sensor-rich vehicle based on first sensor data and assigning, at the first sensor-rich vehicle, a confidence level to the estimated location of the second sensor-rich vehicle. The instructions also cause the one or more processors to transmit, from the first sensor-rich vehicle to the second sensor-rich vehicle via direct V2V communication, the estimated location of the second sensor-rich vehicle and the confidence level assigned to the estimated location of the second sensor-rich vehicle. The instructions also cause the one or more processors to accept, at the first sensor-rich vehicle based on communication between the first and second sensor-rich vehicles and predetermined acceptance criteria, an assignment to perform localization for a legacy vehicle. The instructions also cause the one or more processors to estimate, at the first sensor-rich vehicle, a location of the legacy vehicle based on second sensor data. The instructions also cause the one or more processors to transmit, from the first sensor-rich vehicle to the legacy vehicle, the estimated location of the legacy vehicle.

Another embodiment is a method of distributed cooperative localization in a connected vehicular platform. The method includes receiving, at a first sensor-rich vehicle from a second sensor-rich vehicle with which the first sensor-rich vehicle is in direct vehicle-to-vehicle (V2V) communication, an estimated location of the first sensor-rich vehicle and a confidence level associated with the estimated location of the first sensor-rich vehicle. The method also includes estimating, at the first sensor-rich vehicle, a location of the second sensor-rich vehicle based on first sensor data and assigning, at the first sensor-rich vehicle, a confidence level to the estimated location of the second sensor-rich vehicle. The method also includes transmitting, from the first sensor-rich vehicle to the second sensor-rich vehicle via direct V2V communication, the estimated location of the second sensor-rich vehicle and the confidence level assigned to the estimated location of the second sensor-rich vehicle. The method also includes accepting, at the first sensor-rich vehicle based on communication between the first and second sensor-rich vehicles and predetermined acceptance criteria, an assignment to perform localization for a legacy vehicle. The method also includes estimating, at the first sensor-rich vehicle, a location of the legacy vehicle based on second sensor data. The method also includes transmitting, from the first sensor-rich vehicle to the legacy vehicle, the estimated location of the legacy vehicle.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
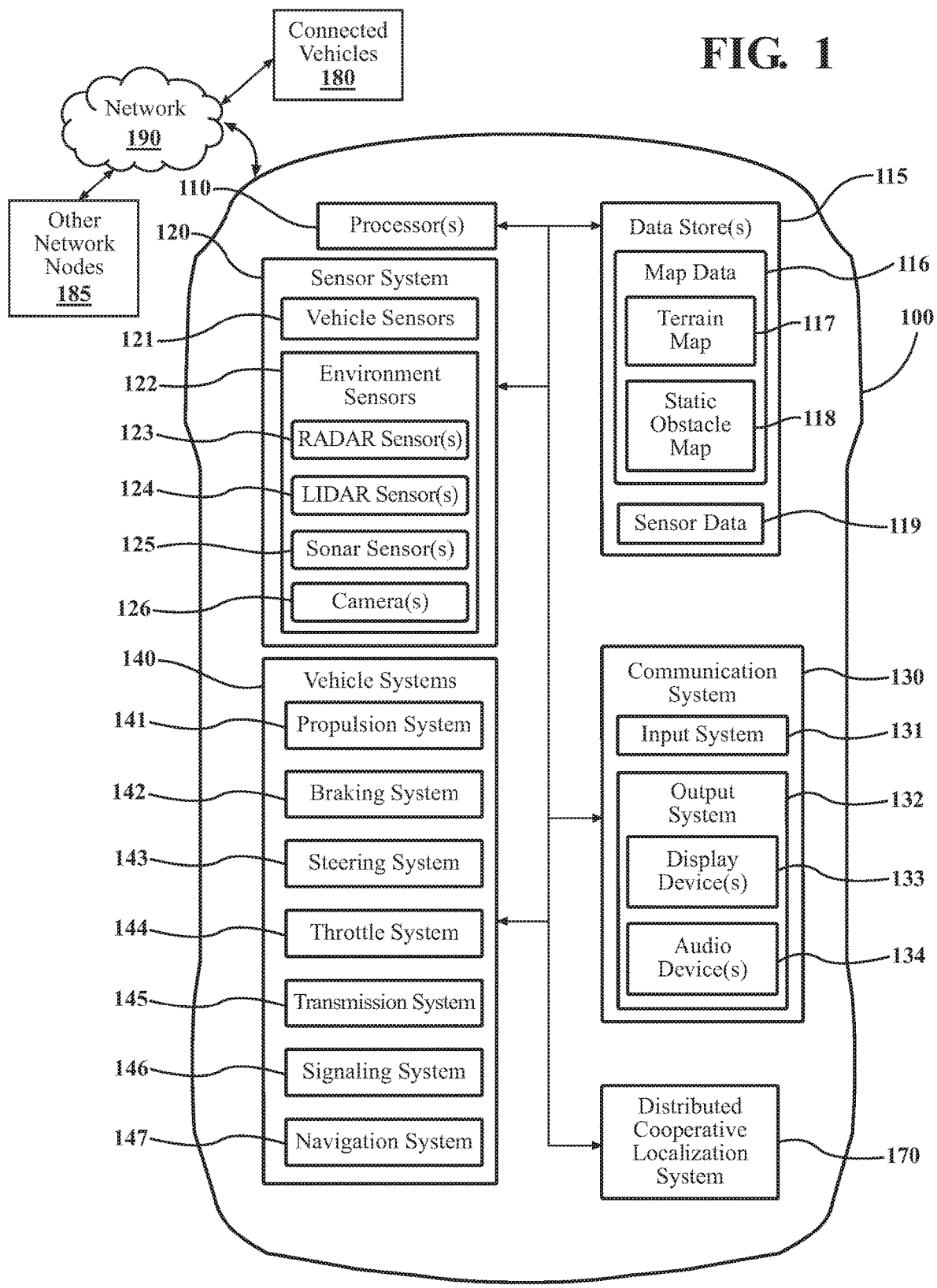
FIG. 1 illustrates one embodiment of a sensor-rich vehicle within which systems and methods disclosed herein may be implemented.

Various embodiments of the invention described herein improve on existing cooperative localization systems in at least two ways. First, the embodiments described herein include embodiments in which cooperative localization is performed in a fully distributed manner within a connected vehicular platform. That is, a group of vehicles forming an ad hoc network communicate with one another without relying on a central edge node or cloud server to coordinate their interactions. Within that framework, localization information shared among the vehicles includes an associated confidence level to permit weights to be applied to location estimates as a distributed optimization problem is solved at the SRVs. In some embodiments, errors in the ranging sensors of vehicles are also modeled and taken into account in the optimization framework.

Second, the embodiments described herein recognize that legacy vehicles (LVs) lack the onboard sensors—cameras, Light Detection and Ranging (LIDAR) sensors, radar sensors, sonar sensors, etc.—with which sensor-rich vehicles (SRVs) are equipped. LVs continue to represent the majority of vehicles on the road today and are expected to be around for at least another decade. The embodiments described herein provide a platform that fosters the coexistence of different generations of vehicles by leveraging the technological advances available in SRVs to assist both SRVs and LVs. More specifically, in some embodiments, this involves SRVs negotiating among themselves to assign a specific SRV to perform localization for a particular LV. The algorithm for assigning a SRV to a subject LV can be based on criteria such as (1) maximizing the number of other SRVs with which the selected SRV is in direct communication that are also in communication with the subject LV and (2) balancing the computational load among the SRVs in a group of networked vehicles.

The distributed cooperative localization techniques described herein support both driver-assistance systems and fully autonomous driving systems. In various embodiments, SRVs use their onboard sensors to compute inferences of the locations of their surrounding vehicles and then communicate that information, along with estimated confidence levels, to their neighbor vehicles via vehicle-to-vehicle (V2V) communication or other wireless communication link. In some embodiments, LVs communicate only with SRVs to share their onboard GPS location estimates and to receive, in exchange, more accurate location estimates from SRVs. In these embodiments, LVs neither perform any sensing of the environment nor communicate with any other LVs. A distributed localization optimization problem is formulated with constraints that restrict its solution to preserve the shape of the traffic participants in the scene. A distributed solution of the problem is performed in which vehicles solve local subproblems and communicate only with their neighbor vehicles. In some embodiments, the distributed optimization problem is solved in accordance with a consensus distributed optimization algorithm, as described in detail below. In other embodiments, a technique described below and referred to as "iterated fusion" is employed to solve the optimization problem.

Referring to FIG. 1, an example of a sensor-rich vehicle (SRV) 100, in which systems and methods disclosed herein can be implemented, is illustrated. Herein, a "sensor-rich vehicle" or "SRV" refers to a vehicle equipped with environmental sensors such as cameras, LIDAR sensors, radar sensors, and/or sonar sensors to support various types of driver-assistance systems and/or autonomous driving. The SRV 100 can include a distributed cooperative localization system 170 or components and/or modules thereof. As used herein, a "vehicle" is any form of motorized transport. In one or more implementations, the SRV 100 can be an automobile. In some implementations, the SRV 100 may be any other form of motorized transport. The SRV 100 can include the distributed cooperative localization system 170 or capabilities to support or interact with the distributed cooperative localization system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of SRV 100, as used herein, are equally applicable to any device capable of incorporating the systems or methods described herein.

The SRV 100 also includes various elements. It will be understood that, in various implementations, it may not be necessary for the SRV 100 to have all of the elements shown in FIG. 1. The SRV 100 can have any combination of the various elements shown in FIG. 1. Further, the SRV 100 can have additional elements to those shown in FIG. 1. In some arrangements, the SRV 100 may be implemented without one or more of the elements shown in FIG. 1, including distributed cooperative localization system 170. While the various elements are shown as being located within the SRV 100 in FIG. 1, it will be understood that one or more of these elements can be located external to the SRV 100 or be part of a system that is separate from SRV 100. Further, the elements shown may be physically separated by large distances.

As shown in FIG. 1, SRV 100 may communicate with one or more other connected vehicles 180 via a network 190. Those other vehicles may include other SRVs similar to SRV 100 and legacy vehicles (LVs). Herein, a "legacy vehicle" or "LV" is a vehicle that lacks environmental sensors such as cameras, LIDAR sensors, radar sensors, and sonar sensors but includes a Global Positioning System (GPS) unit or subsystem for ascertaining the LV's location, at least approximately. Also, in some embodiments, as shown in FIG. 1, SRV 100 may communicate with other network nodes 185 such as users' mobile devices, cloud servers (e.g., traffic-information servers), edge nodes, and roadside units (RSUs).

In FIG. 1, network 190 represents any of a variety of wired and wireless networks. For example, in communicating directly with another vehicle, sometimes referred to as vehicle-to-vehicle (V2V) communication, SRV 100 can employ a technology such as dedicated short-range communication (DSRC) or Bluetooth Low Energy (BLE). In some embodiments, SRV 100 communicates with other SRVs via V2V communication and communicates with LVs via V2V communication or, if a V2V connection is not possible, via cellular data (i.e., via a cellular communication network). In communicating with a user's mobile device (e.g., a smartphone) or a cloud server, SRV 100 can use a technology such as cellular data. In some embodiments, network 190 includes the Internet.

Some of the possible elements of the SRV 100 are shown in FIG. 1 and will be described in connection with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
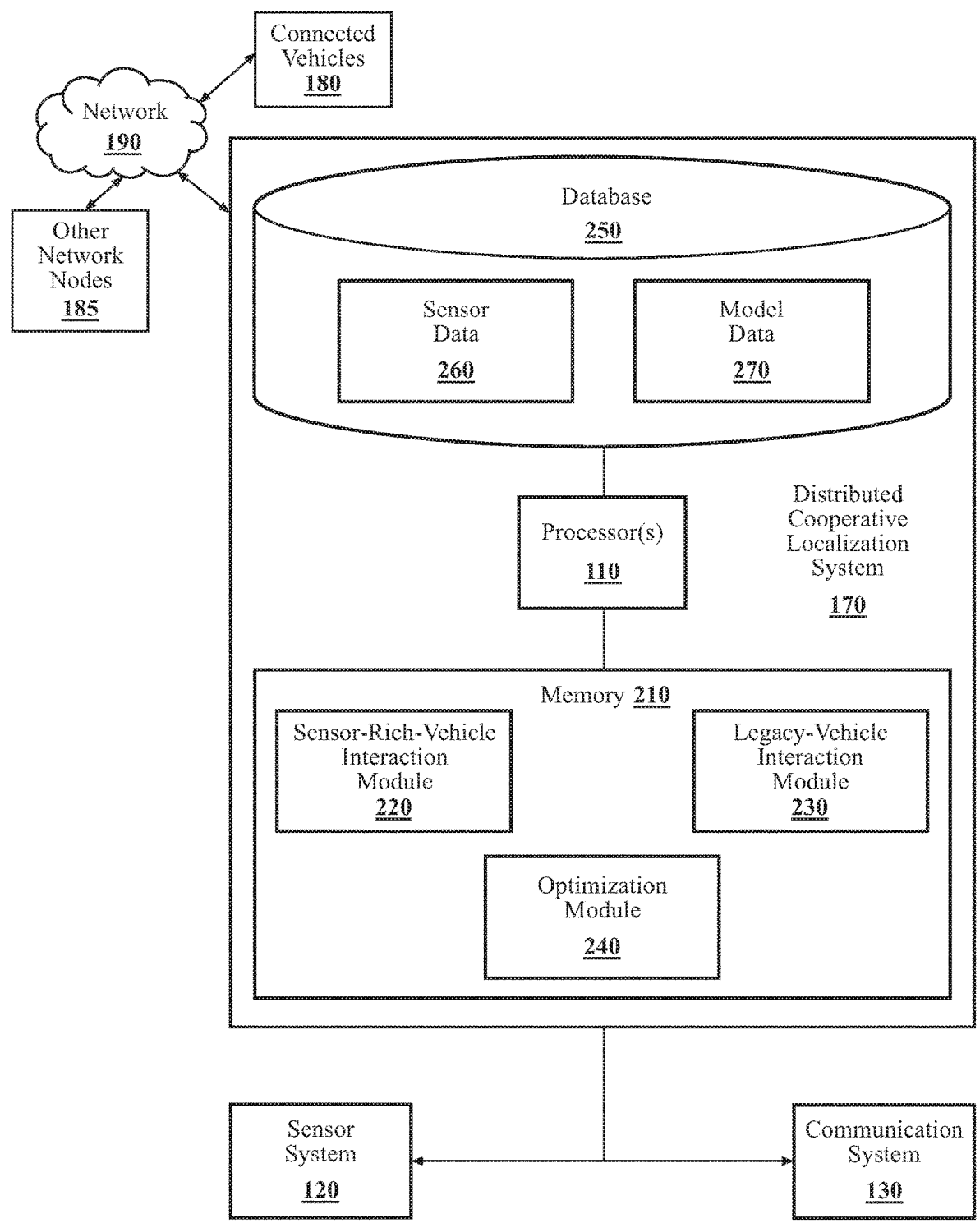
FIG. 2 illustrates one embodiment of a distributed cooperative localization system.

Referring to FIG. 2, the distributed cooperative localization system 170 is shown as including one or more processors 110 from the SRV 100 of FIG. 1. Accordingly, the one or more processors 110 may be a part of the distributed cooperative localization system 170, the distributed cooperative localization system 170 may include one or more separate processors from the one or more processors 110 of the SRV 100, or the distributed cooperative localization system 170 may access the one or more processors 110 through a data bus or another communication path. In one embodiment, the distributed cooperative localization system 170 includes a memory 210 that stores a sensor-rich-vehicle interaction module 220, a legacy-vehicle interaction module 230, and an optimization module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the one or more processors 110, cause the one or more processors 110 to perform the various functions disclosed herein. In performing their various functions, the modules of distributed cooperative localization system 170 make use of sensor data 260 and generate and store various kinds of model data 270. The sensor data 260 and the model data 270 can be stored in a database 250. The specific kinds of model data 270 are discussed in detail below in connection with the optimization algorithms.

As shown in FIG. 2, distributed cooperative localization system 170 can communicate with one or more connected vehicles 180 (other SRVs and LVs) and with other network nodes 185 via network 190, as discussed above in connections with FIG. 1. In some embodiments, distributed cooperative localization system 170 may communicate with other systems or subsystems of SRV 100 such as sensor system 120 and communication system 130.

The remainder of the description is organized as follows. First, in connection with FIG. 2, an overview is provided of the functions performed by sensor-rich-vehicle interaction module 220, legacy-vehicle interaction module 230, and optimization module 240. Second, a connected vehicular platform that includes multiple SRVs equipped with a distributed cooperative localization system 170 and one or more LVs is discussed in connection with FIGS. 3-6. Third, the optimization algorithms employed by optimization module 240 in particular embodiments are described in greater technical and mathematical detail. Finally, a summary of the methods of the invention is provided in connection with the flowchart of FIG. 7.

Referring once again to FIG. 2, sensor-rich-vehicle interaction module 220 of a distributed cooperative localization system 170 in a first SRV (e.g., SRV 100 discussed above) generally includes instructions that when executed by the one or more processors 110 cause the one or more processors 110 to receive, from a second SRV with which the first SRV is in direct V2V communication, an estimated location of the first SRV and a confidence level associated with the estimated location of the first SRV. The communications among connected vehicles (SRVs and LVs) are discussed in greater detail below in connection with FIGS. 3, 5, and 6. In this embodiment, the second SRV assigns a confidence level to the estimated location of the first SRV based on factors such as the distance between the first and second SRVs, environmental conditions (e.g., weather), the type and quality of the environmental sensors with which the second SRV is equipped, and other factors. The confidence level associated with the estimated location of the first SRV permits optimization module 240 to assign a weight to the estimated location of the first SRV in connection with a distributed optimization algorithm that accurately estimates the location of each vehicle in a group of networked vehicles.

Sensor-rich-vehicle interaction module 220 also includes instructions that when executed by the one or more processors 110 cause the one or more processors 110 to estimate a location of the second SRV based on sensor data 260 obtained from one or more vehicular sensors and to assign a confidence level to the estimated location of the second SRV. As discussed above, a SRV includes sensors such as cameras 126, LIDAR sensors 124, radar sensors 123, and/or sonar sensors 125. As those skilled in the art area aware, LIDAR sensors 124, radar sensors 123, and sonar sensors 125 are particularly useful for ranging measurements—measuring the distance from a SRV to another vehicle or other object in the environment. In this embodiment, the first SRV assigns a confidence level to the estimated location of the second SRV based on one or more of the factors discussed above.

Sensor-rich-vehicle interaction module 220 also includes instructions that when executed by the one or more processors 110 cause the one or more processors 110 to transmit, to the second SRV via direct V2V communication, the estimated location of the second SRV and the confidence level assigned to the estimated location of the second SRV. At this point, the first and second SRVs have exchanged with each other, via V2V communication, an estimate of each other's location. As discussed further below, this process can be repeated iteratively until the location estimates converge in accordance with predetermined convergence criteria (e.g., the change in location estimates from iteration to iteration drops below a predetermined threshold).

Legacy-vehicle interaction module 230 of a distributed cooperative localization system 170 in a first SRV (e.g., SRV 100 discussed above) generally includes instructions that when executed by the one or more processors 110 cause the one or more processors 110 to accept, based on communication between the first and second SRVs and predetermined acceptance criteria, an assignment to perform localization for a LV. In some embodiments, the SRVs in a group of networked vehicles negotiate among themselves to decide which SRV should take the assignment to perform localization for a particular LV in the group (i.e., to estimate the position of the particular LV to provide more accurate location information to the LV than the LV can obtain from its own onboard GPS unit). The negotiation process can involve one or more messages communicated among two or more candidate SRVs.

In some embodiments, the predetermined acceptance criteria include how many other SRVs with which a given SRV is in direct communication are also in communication with the subject LV. A SRV that can communicate with more SRVs that are able to detect the subject LV is favored, in these embodiments, over an SRV that is able to communicate with fewer SRVs that are able to detect the subject LV. In some embodiments, the predetermined acceptance criteria include consideration of the current computational load of a given candidate SRV. For example, even if SRV 1 is in communication with more SRVs that can also detect LV 1 than SRV 2, if SRV 1 is already assigned to a lot of LVs, SRV 1 might negotiate with SRV 2 to perform localization for LV 1 anyway to avoid overloading SRV 1. The two predetermined acceptance criteria discussed above can be used together and balanced as circumstances require. This is explained in further detail below in the sections discussing the optimization algorithms. In other embodiments, additional or different predetermined acceptance criteria can be considered during the negotiation process.

In a different embodiment, a central operation-center server that is in communication with all of the participating vehicles assigns SRVs to perform localization for specific LVs.

Legacy-vehicle interaction module 230 also includes instructions that when executed by the one or more processors 110 cause the one or more processors 110 to estimate the location of the subject LV based on sensor data 260 from one or more sensors installed on the first SRV (recall from the discussion above that the first SRV accepted an assignment to perform localization for the subject LV). For example, legacy-vehicle interaction module 230 can use ranging (distance) data obtained from one or one or more LIDAR sensors 124, one or more radar sensors 123, and/or one or more sonar sensors 125 in combination with other data (e.g., image data from one or more cameras 126, the first SRV's own localization data, GPS data, etc.) to estimate the location (e.g., coordinates) of the subject LV.

Legacy-vehicle interaction module 230 also includes instructions that when executed by the one or more processors 110 cause the one or more processors 110 to transmit, to the subject LV, the estimated location of the subject LV. In some embodiments, the first SRV transmits the estimated location of the subject LV to the subject LV via a direct V2V connection. In other embodiments, this is accomplished via a cellular data network.

In some embodiments, legacy-vehicle interaction module 230 of a distributed cooperative localization system 170 in a first SRV (e.g., SRV 100 discussed above) also includes instructions that when executed by the one or more processors 110 cause the one or more processors 110 to receive, from the subject LV discussed above, location information (e.g., GPS coordinates) for the subject LV. In the larger distributed optimization problem involving multiple networked vehicles discussed in further detail below, the GPS-based location information reported by a LV to one or more SRVs can be considered along with other location data (e.g., location measurements from one or more SRVs). In some embodiments, the LV assigns a confidence level to the reported location data. For example, some GPS units generate a confidence level for the position data they output. The LV can report the confidence level to one or more SRVs in addition to the LV's location information itself. Especially when an iterative optimization process is executed to the point of convergence, the estimated location of a LV transmitted to the LV by a SRV is more accurate than the location information for the LV (e.g., GPS coordinates from the LV's GPS unit) received from the LV by a SRV.

Optimization module 240 of a distributed cooperative localization system 170 in a first SRV (e.g., SRV 100 discussed above) generally includes instructions that when executed by the one or more processors 110 cause the one or more processors 110 to execute iteratively at least the instructions discussed above in the sensor-rich-vehicle interaction module 220 and the legacy-vehicle interaction module 230 in accordance with an optimization algorithm until predetermined convergence criteria have been satisfied with respect to the estimated location of the first SRV, the estimated location of a second SRV, and the estimated location of a LV (e.g., that the aggregate change in the location estimates from iteration to iteration falls below a predetermined threshold). Two specific optimization algorithms, (1) consensus distributed optimization and (2) iterated fusion, are discussed in detail below.

In some embodiments, optimization module 240 includes instructions that when executed by the one or more processors 110 cause the one or more processors 110 to assign a weight to the estimated location of the first SRV based, at least in part, on the confidence level associated with the estimated location of the first SRV. This assigning of a weight can be part of an optimization algorithm in which the locations of the vehicles in a group of networked vehicles (SRVs and LVs) are estimated, as discussed further below. In some embodiments, optimization module 240 also includes instructions to model the errors inherent in ranging sensors such as LIDAR sensors 124, radar sensors 123, or sonar sensors 125. This leads to more accurate estimates of vehicle locations during the optimization process.

Figure 3:
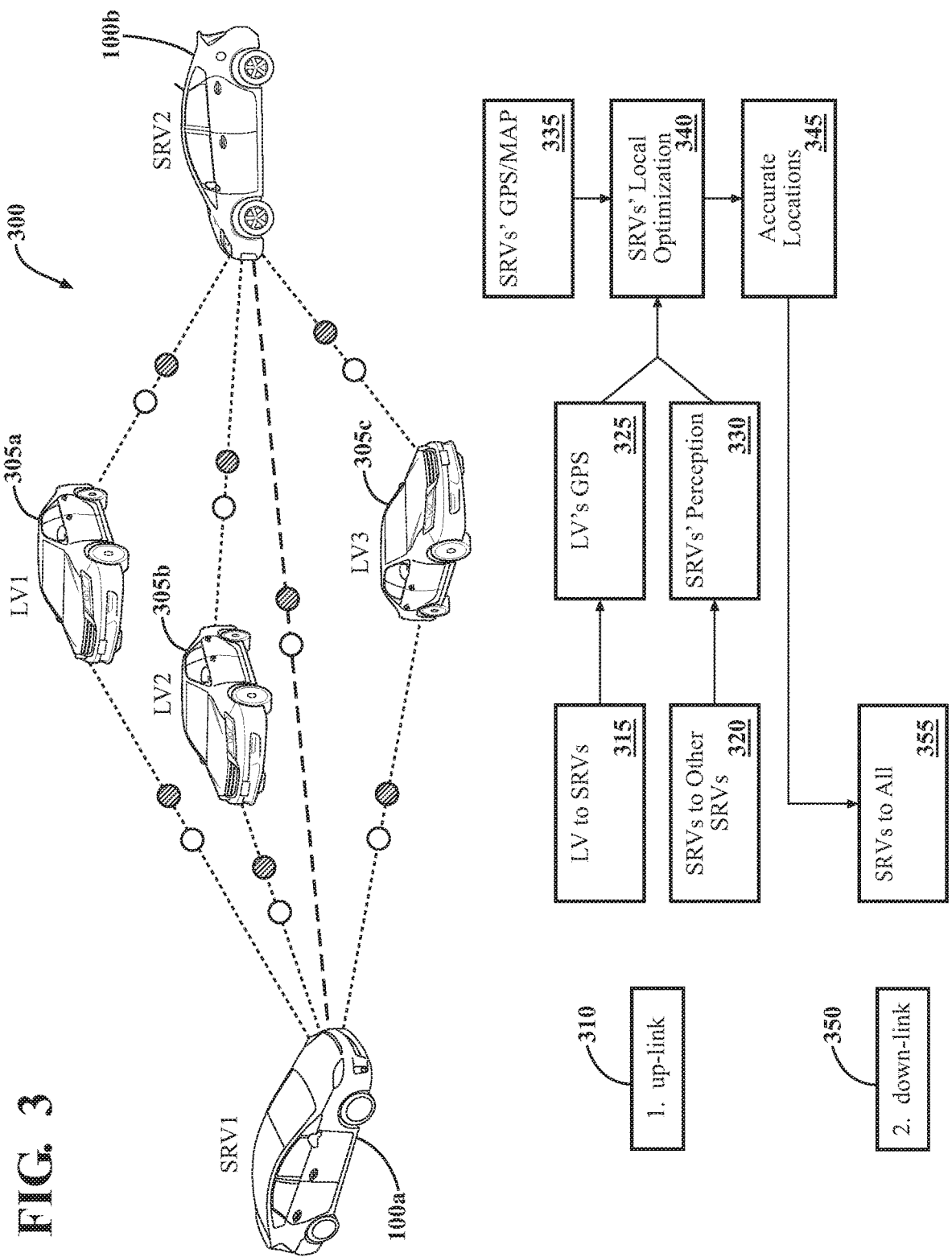
FIG. 3 illustrates a connected vehicular platform in which vehicles perform distributed cooperative localization, in accordance with an illustrative embodiment of the invention.

FIG. 3 illustrates a connected vehicular platform 300 in which vehicles perform distributed cooperative localization, in accordance with an illustrative embodiment of the invention. In FIG. 3, the connected vehicular platform 300 includes SRV 1 (100*a*), SRV 2 (110*b*), LV 1 (305*a*), LV 2 (305*b*), and LV 3 (305*c*). The particular configuration shown in FIG. 3 is merely one example. In other situations, there could be more or fewer SRVs and LVs. As discussed above, in various embodiments, the SRVs use their onboard sensors to compute inferences of the locations of their surrounding vehicles and then communicate that information, along with estimated confidence levels, to their neighbor vehicles via V2V communication or another wireless communication link. In some embodiments, LVs communicate only with SRVs to share their onboard GPS location estimates and to receive, in exchange, more accurate location estimates from SRVs. In these embodiments, LVs neither perform any sensing of the environment nor communicate with any other LVs, as indicated in FIG. 3. A distributed localization optimization problem is formulated with constraints that restrict its solution to preserve the shape of the traffic participants in the scene. A distributed solution of the problem is performed in which vehicles solve local subproblems and communicate only with their neighbor vehicles. In this context, a "neighbor vehicle" is a vehicle that a vehicle can detect and with which the vehicle is in direct communication. As discussed above, communication among SRVs is, in this embodiment, V2V communication. Communication between SRVs and LVs can be V2V communication or, in other embodiments, a cellular-data link.

Referring to the bottom portion of FIG. 3, the up-link 310 communication path involves the LVs (LV 1 (305*a*), LV 2 (305*b*), and LV 3 (305*c*)) transmitting their location information (e.g., GPS coordinates) to the SRVs with which they are networked (315, 325) and the SRVs that are networked with one another (SRV 1 (100*a*), SRV 2 (110*b*)) sharing their mutual location estimates for one another with one another (320, 330). The SRVs perform their local optimizations based on the data they have received from other vehicles, GPS data, and map data 116 (335, 340). Completion of the optimization algorithm by the networked SRVs leads to accurate location estimates of all participating vehicles at the SRVs (345). The down-link 350 communication path involves the SRVs sharing the accurate estimated locations (345) with all of the networked vehicles, including the LVs (355). Thus, the LVs also benefit from the distributed cooperative localization process.

Figure 4:
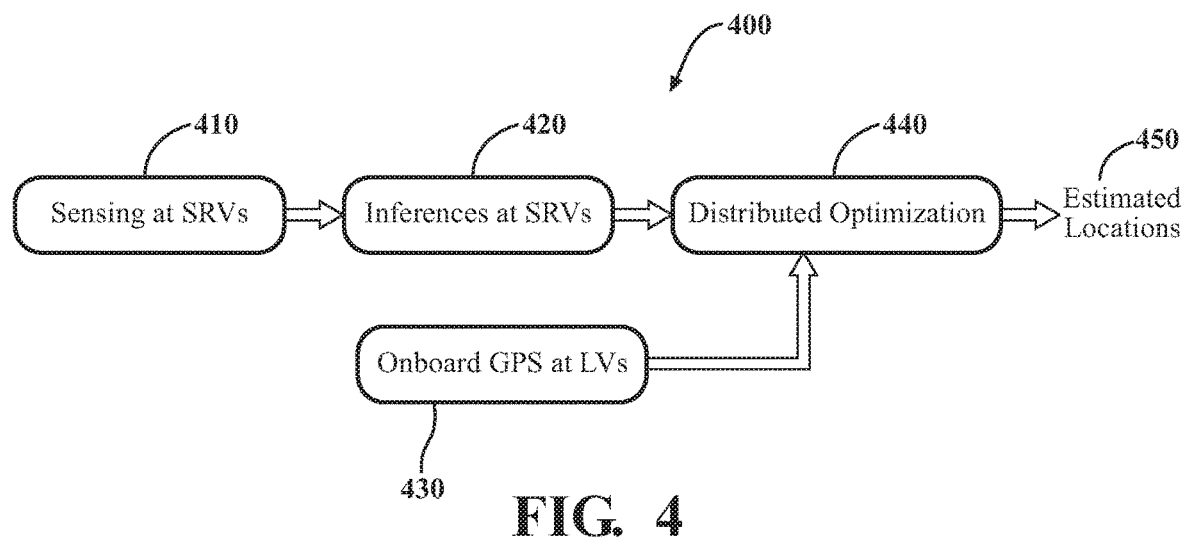
FIG. 4 is a flow diagram for distributed cooperative localization in a connected vehicular platform, in accordance with an illustrative embodiment of the invention.

FIG. 4 is a flow diagram for distributed cooperative localization 400 in a connected vehicular platform (e.g., connected vehicular platform 300 discussed above in connection with FIG. 3), in accordance with an illustrative embodiment of the invention. FIG. 4 provides a high-level overview of the various embodiments described herein. At block 410, the SRVs sense the environment using their onboard sensors, as discussed above. At block 420, the SRVs make inferences regarding the locations of other networked vehicles based on their perceptions (e.g., sensor data 260). At block 430, the LVs report their onboard GPS data to the applicable SRVs. At block 440, the SRVs perform a distributed optimization process that leads to estimated locations 450 for the networked vehicles in the connected vehicular platform.

Figure 5:
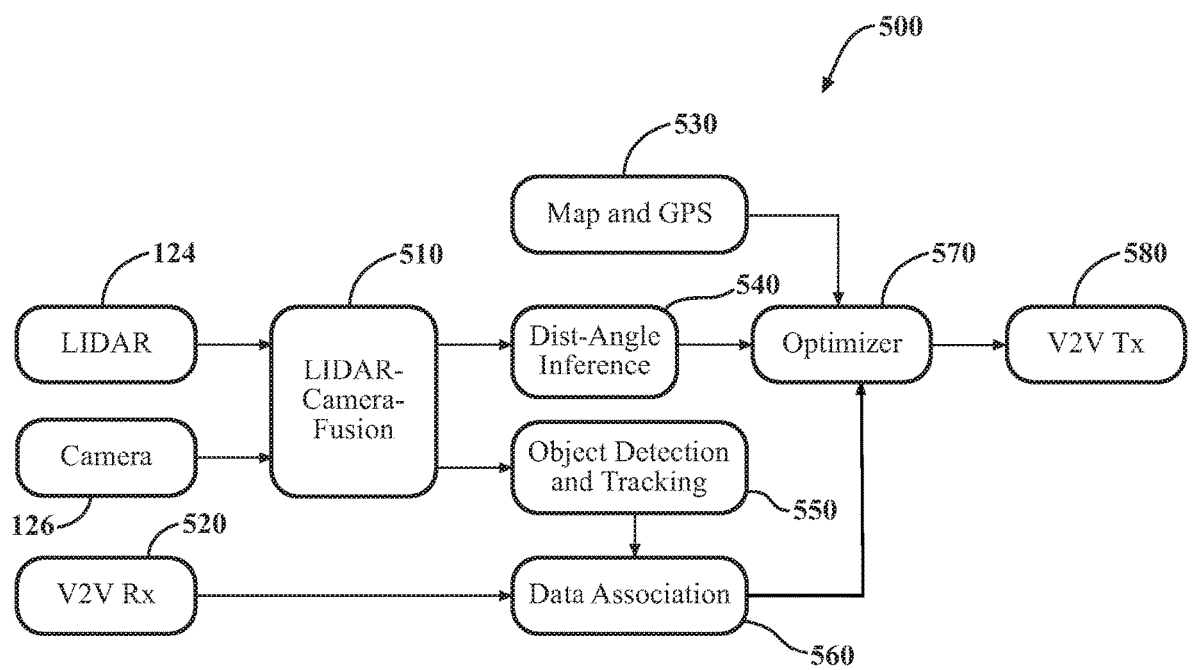
FIG. 5 illustrates an architecture for a sensor-rich vehicle, in accordance with an illustrative embodiment of the invention.

FIG. 5 illustrates an architecture 500 for a SRV 100, in accordance with an illustrative embodiment of the invention. As discussed above, SRV 100 includes environmental sensors such as LIDAR sensor(s) 124 and camera(s) 126 for detecting and tracking surrounding vehicles and other objects. The LIDAR-camera-fusion block 510 is responsible for overlaying the three-dimensional point clouds from the LIDAR sensor(s) 124 and the two-dimensional images from the camera(s) 126 to detect and track vehicles (see object detection and tracking block 550). Each detected vehicle is given a unique identifier (instance segmentation), and the LIDAR-camera-fusion block 510 outputs an estimate for the relative distance and angle to each detected vehicle (distance-angle inference block 540).

Location estimates and their associated confidence levels are received via V2V Rx (receive) block 520. That data and the output of object detection and tracking block 550 are input to data association block 560. An SRV 100 receives information reported by its neighboring vehicles through V2V communication (520). Simultaneously, the SRV 100 detects surrounding vehicles (other SRVs and/or LVs) through its onboard sensors. These two data sources are independent of each other. Therefore, a data-association problem arises. Data association involves an SRV associating the data it receives from a certain vehicle through V2V communication with the unique ID assigned to that vehicle during the object detection process (550). In one embodiment, this is achieved through a bipartite graph matching algorithm.

In one embodiment, the bipartite graph matching algorithm involves calculating the correspondence between two sets: Set A, the SRV's object-detection data, and Set B, the location data received from other vehicles via V2V communication. Bipartite graph matching involves exploring the correspondence between the two sets, Set A and Set B, by calculating metrics corresponding to their feature representations. More specifically, the matching process may include a similarity comparison based on a distance metric. This can include comparing nodes and angles between the two sets. The theoretical principle behind the matching process is the view-invariant property of the scene.

Referring once again to FIG. 5, the estimated distances and angles are input to optimizer block 570, and data from map and GPS block 530 is also input to optimizer block 570. The goal of a distributed cooperative localization system 170 deployed in each SRV is to enhance the localization accuracy at all participating (networked) vehicles. The enhancement is done via collecting location estimates from neighboring vehicles as well as onboard GPS and fusing this information to solve an optimization problem. In some embodiments, the localization problem is formulated to estimate the locations of all participating vehicles so as to minimize a weighted sum of the location errors, where the weights are assigned to the received information from each vehicle based on the confidence level associated with the information.

In the embodiments just mentioned, the optimization algorithm is not greedy at each vehicle; i.e., a vehicle not only cares about its own accuracy but also contributes to the enhancement of the overall localization accuracy of the traffic participants. A set of constraints are defined, which can include enforcing bounds on the deviation of the location of a vehicle from its onboard GPS reading as well as its own location estimates and the location estimates sent to it by its neighboring SRVs. In addition, estimated locations can be presumed to obey the road-geometry constraints implied by local map data. Furthermore, the estimated locations are constrained to preserve the shape of the traffic scene via enforcing a bound on the consistency of the locations with the proactive measurements from SRVs. Although the overall system optimization has global optima, the system is able to achieve the objective with a fully distributed computation in which SRVs solve their local optimization subproblems and share their decisions with only their neighbor vehicles via V2V communication. That is, in these embodiments, no centralized optimization solver (e.g., at an edge node or cloud server) that aggregates all information from all vehicles is required. This is instead achieved via consensus distributed optimization. That approach and iterated fusion are discussed in greater detail below. The output of the optimizer can be transmitted via V2V Tx (transmit) block 580.

Figure 6:
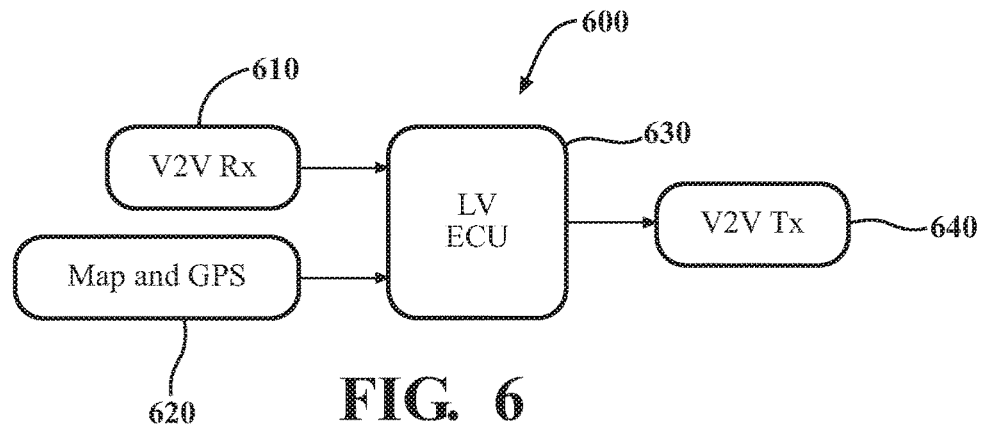
FIG. 6 illustrates an architecture for a legacy vehicle, in accordance with an illustrative embodiment of the invention.

FIG. 6 illustrates an architecture 600 for a LV, in accordance with an illustrative embodiment of the invention. The requirements at an LV are relatively simple. A LV receives location estimates from SRVs via V2V Rx (receive) block 610 and makes use of map data and GPS data from map and GPS block 620. The LV includes an electronic control unit (ECU) 630, and the LV transmits its GPS-based location information to one or more SRVs via V2V Tx (transmit) block 640.

The optimization algorithms mentioned above will next be described. The discussion of the optimization algorithms is divided into sections delineated by section headings.

Brief Overview of Consensus Optimization

This section provides a brief introduction to the core concepts underlying the distributed localization optimization algorithms discussed in detail below. Given a connected undirected computation graph $\mathbb{G}=(\mathcal{V}, \varepsilon)$ with vertices $\mathcal{V}$ and edges $\varepsilon \subset \mathcal{V} \times \mathcal{V}$, consider the following optimization problem ("Problem A"): $\min_{y} \sum_{i \in v} \Phi_i(y)$ with a global n-dimensional decision variable $y \in \mathbb{R}^n$, and a local cost function $\Phi_i: \mathbb{R}^n \to \mathbb{R} \cup \{+\infty\}$ that possibly encodes constraints on y. Distributed optimization seeks to solve Problem A by performing local computations at each node $i \in \mathcal{V}$ and allowing communications among neighbors. Problem A can be cast as a consensus optimization problem by introducing a copy of the global decision variable denoted by $y_i \in \mathbb{R}^n$ local to node $i \in \mathcal{V}$ and solving the following "Problem B" instead:

$$\min_{[y_i]_{i \in v}} \sum_{i \in v} \Phi_i(y_i),$$

subject to $y_i = y_j$, $(i,j) \in \varepsilon$. It directly follows from the two formulations that Problems A and B are equivalent, provided that $\mathbb{G}$ is connected. However, Problem B facilitates the development of distributed algorithms that perform local updates at each node $i \in \mathcal{V}$ of the generic form $y_i^{k+1} \leftarrow g_i(\sum_{j \in \mathcal{N}_i \cup \{i\}} \beta_{ij} y_j^k)$, where $\beta_{ij} \in \mathbb{R}$ are mixing weights assigned by node i to the decisions shared by a neighboring node $j \in \mathcal{N}_i$, $\mathcal{N}_i$ being the set of neighbors of node i, and $g_i: \mathbb{R}^n \to \mathbb{R}^n$ is a carefully designed mapping that depends on $\Phi_i$. Distributed algorithms craft the choice of the mixing weights as well as the maps $g_i$ to guarantee convergence to a solution of the original Problem A.

Centralized Problem Formulation

In this section, the localization task is cast as an optimization problem. Though algorithms for a distributed solution are presented in subsequent sections, a centralized solver is described first to introduce certain notation and terminology that will be relied upon later in the description.

The traffic scene is represented by a connected undirected graph $\mathbb{G}=(V, \varepsilon)$ with a set of vertices $\mathcal{V}$ representing the participating vehicles, and a set of edges $\varepsilon \subset \mathcal{V} \times \mathcal{V}$. The graph $\mathbb{G}$ is undirected; thus, $(i,j) \in \varepsilon$ implies that $(j, i) \in \varepsilon$. Let $\mathcal{S}$ and $\mathcal{L}$ denote the sets of SRVs and LVs, respectively. That is, $\mathcal{V} = \mathcal{S} \cup \mathcal{L}$. A vehicle in $\mathcal{S}$ is assumed connected by an edge to any vehicle it can detect using its ranging sensors. However, a given LV, in this embodiment, is connected only to the SRVs that can detect that LV (no LV to LV connections, due to the lack of sensing capabilities). In other words, at least one endpoint of any edge $(i,j) \in \varepsilon$ is a SRV. Indeed, an edge encodes a detection made by an SRV of another vehicle in its vicinity. For each $i \in \mathcal{V}$, let $\mathcal{D}_i$ denote the set of SRVs that can detect vehicle i; i.e., $\mathcal{D}_i = \{j \in \mathcal{S}: (i,j) \in \varepsilon\}$. Furthermore, let $\mathcal{O}_i = \mathcal{D}_i \cup \{i\}$ for all $i \in \mathcal{V}$.

A global two-dimensional coordinate system can be defined to express the location of all participating vehicles. For $(i,j) \in \varepsilon$, let $c_{ij} \in \mathbb{R}^2$ be the location of vehicle $i \in \mathcal{V}$ measured by vehicle $j \in \mathcal{S}$. Furthermore, let $d_{ij} \in \mathbb{R}_+$ and $\phi_{ij} \in [0, 2\pi]$ be the relative distance and heading, respectively, between vehicles j and i.

The centralized localization optimization problem can be formulated as follows ("Problem 1"):

$$\min_{[x_i]_{i \in v}} \sum_{i \in v} \sum_{j \in O_i} w_{ij} \|x_i - c_{ij}\|^2$$

s.t.

C1: $\|x_i - c_{ij}\| \le b_{ij}$, $i \in \mathcal{V}$, $j \in \mathcal{O}_i$
C2: $x_i \in \mathcal{R}_i$, $i \in \mathcal{V}$
C3: $|x_{j,e} + d_{ij} \cos(\phi_{ij}) - x_{i,e}| \le a_{ij}^e$, $i \in \mathcal{V}$, $j \in \mathcal{D}_i$
C4: $|x_{j,n} + d_{ij} \sin(\phi_{ij}) - x_{i,n}| \le a_{ij}^n$, $i \in \mathcal{V}$, $j \in \mathcal{D}_i$, where $x_i \in \mathbb{R}^2$ is the location of vehicle i, and $w_{ij} \ge 0$ is a weight parameter assigned to the information measured by vehicle j concerning vehicle i. The localization problem also takes into account that there exist potentially multiple estimated locations for each vehicle $i \in \mathcal{V}$, one from its onboard GPS (i.e., $c_{ii}$) and others from each SRV that can detect vehicle i (i.e., $c_{ij}$ for all $j \in \mathcal{D}_i$).

The optimization problem referred to above as "Problem 1" aims at minimizing the weighted sum of localization errors for all vehicles. In some embodiments, the fidelity of the measurements is taken into account in the objective function through the weight parameters $w_{ij}$. The higher the accuracy of the measurements of vehicle j, the higher the weight assigned by vehicle i to these measurements. These weights can be included to account for the various levels of measurement accuracy among the participating vehicles.

Constraint C1 enforces a limit on the deviation of the location of each vehicle from the measurements captured by its neighbors as well as its onboard GPS, which can be related to the confidence level in those measurements. That is, for vehicle $i \in \mathcal{V}$, the location estimate is restricted to lie within the intersection of a collection of norm balls with centers being its location measurements, and the corresponding radii $b_{ij} > 0$ being dependent on the fidelity of those estimates. The set of constraints C1 is complementary to the weights introduced in Problem 1. Furthermore, constraint C2 refines the location estimates by restricting them to lie within the road boundaries $\mathcal{R}_i$. In practice, these constraints are inferred from a local map available at the vehicle.

Constraints C3 and C4 preserve the global shape of the traffic scene. This makes the ranging measurements obtained by SRVs consistent, to some degree, with the location estimates. For example, ranging measurements $[d_{ij}, \phi_{ij}]^T$ corresponding to vehicles i and j such that $(i, j) \in \varepsilon$ is constrained to be close to the location estimate $x_i = [x_{i,e}, x_{i,n}]^T$ (i.e., easting and northing coordinates, respectively). The superscript T denotes the transpose operator. Here, $a_{ij}^e \geq 0$ and $a_{ij}^n \geq 0$ are the deviation bounds which can be related to the accuracy of the ranging sensors of the SRVs.

The centralized localization optimization problem can also be generalized as follows ("Problem 1A"):

$$\min_{f_i \in \mathbb{P}} \sum_{j \in O_i} D(f_i \| f_{ij}),$$

where $f_i$ is a probability distribution that represents the local belief on the state of vehicle i and $f_{ij}$ is a probability distribution that represents the local belief on the state of vehicle j at vehicle i. $\mathbb{P}$ denotes the space of all possible probability distributions defined on the state space of vehicle i and $D(f_i \| f_{ij})$ is a function to measure the similarity between the pair of distributions $f_i$ and $f_{ij}$. Note that "Problem 1" is a special case of "Problem 1A."

Distributed Cooperative Localization

Problem 1 above can be solved using a centralized solver that aggregates all measurements SRVs and LVs, solves the optimization problem, and informs the participating vehicles about their optimized locations. For example, this centralized solver could be an edge node or a cloud server. However, such a solution depends on the infrastructure network, which might not always be available. Thus, a distributed solution to the localization problem is chosen in which the participating SRVs are used as compute nodes that contribute to the solution of the overall problem.

Assignment of LVs to SRVs

In these embodiments, in contrast to SRVs, LVs are neither equipped with computational capabilities nor fast V2V communication systems. Thus, the objective is to solve a variant of Problem 1 in a distributed manner using only SRVs as compute nodes. The task of localizing LVs is assigned to SRVs, and the locations of LVs determined by SRVs are transmitted back to the corresponding LVs via V2V communication (or possibly cellular data, if the LVs are not capable of V2V communication). In these embodiments, each LV is assigned to one and only one SRV so that a certain metric is optimized. In one embodiment, the following assignment rule alluded to above is used. For an LV $\ell \in \mathcal{L}$, i* is the selected SRV responsible for localizing that LV such that $$i^* \in \underset{i \in \mathcal{S}}{\operatorname{argmax}} |\mathcal{D}_i \cap \mathcal{D}_\ell|,$$

where $|\cdot|$ denotes the cardinality of a set, and a nearest neighbor policy is used to break ties, in case $\operatorname{argmax}\{|\mathcal{D}_i \cap \mathcal{D}_\ell|: i \in \mathcal{S}\}$ is not a singleton. For an LV $\ell \in \mathcal{L}$ and an SRV $i \in \mathcal{S}$, the larger $|\mathcal{D}_i \cup \mathcal{D}_\ell|$ is, the more measurements captured by SRVs regarding LV $\ell$ can be leveraged to enhance the localization of LV $\ell$. For an SRV $i \in \mathcal{S}$, let $\mathcal{L}_i \subset \mathcal{L}$ be the set of LVs assigned to i.

The rule just described might result in some SRVs becoming overwhelmed with too many assigned LVs. Therefore, further consideration of the computational burden on SRVs can also be incorporated. That is, other assignment objectives might be optimized to maintain a balance between leveraging as much information as possible while distributing the computational load fairly among participating SRVs. An example will be provided of a metric that induces this behavior. Consider $y_\ell \in \mathcal{S}$ to be the SRV assigned to LV $\ell$, then one might seek an assignment $y = [y_\ell]_{\ell \in \mathcal{L}}$ that solves the following problem ("Problem 2"):

$$\max_y \sum_{\ell \in \mathcal{L}} |\mathcal{D}_{y_\ell} \cap \mathcal{D}_\ell| - \sum_{i \in \mathcal{S}} \left| \bar{y}_S - \sum_{\ell \in \mathcal{L}} 1(y_\ell = i) \right|$$

s.t. $y_\ell \in \mathcal{S}$, $\ell \in \mathcal{L}$, where $1(e)$ equals 1 if event e is true and 0 otherwise, and $\bar{y}_S$ is the average number of LVs assigned to an SRV:

$$\bar{y}_S = \frac{1}{|\mathcal{S}|} \sum_{i \in \mathcal{S}} \sum_{\ell \in \mathcal{L}} 1(y_\ell = i) = \frac{|\mathcal{L}|}{|\mathcal{S}|}.$$

Thus, the objective function in Problem 2 intuitively seeks an assignment that maximizes the benefit of using information while penalizing the variation in the number of LVs assigned to SRVs. The fairness in distributing the computational burden is encoded by the penalty imposed on the deviation from average at each SRV. Note that the solution of Problem 2 will reduce to that in the first rule discussed in this subsection $$\left( i^* \in \underset{i \in \mathcal{S}}{\operatorname{argmax}} |\mathcal{D}_i \cap \mathcal{D}_\ell| \right)$$

if the second term is ignored. For the remainder of this description, that first rule will be applied rather than the formulation in Problem 2.

Consensus Problem Formulation

Examining the localization problem in Problem 1 reveals a rich separable structure. This structure is exploited to render the problem amenable to decentralization. For example, the objective function is separable among all vehicles. Furthermore, the constraints C1 and C2 are local to each vehicle. However, the locations of different vehicles are coupled through the constraints in C3 and C4 that are responsible for preserving the shape of the traffic scene and producing solutions consistent with the measurements captured by SRVs.

First, the complication introduced by constraints C3 and C4 to the solution of Problem 1 is demonstrated. If these two sets of constraints are not enforced, the solution of the localization problem can be obtained in a distributed fashion as follows. Vehicles will only need to exchange location estimates $c_{ij}$. Then, each vehicle $i \in \mathcal{V}$ can independently solve for its own location by solving the following problem ("Problem 3"):

$$\min_{x_i} \sum_{j \in O_i} w_{ij} \|x_i - c_{ij}\|^2$$

s.t.
C1: $\|x_i - c_{ij}\| \leq b_{ij}$, $j \in \mathcal{O}_i$
C2: $x_i \in \mathcal{R}_i$ In other words, each vehicle is able to localize itself by simply fusing the information received from neighboring vehicles that can detect it. Though this strategy is appealing, since it results in a low required computational load at each vehicle, it produces solutions that may not be consistent with the relative distance and angle measurements captured by SRVs. It is desirable to reap the reward of enforcing these constraints while not paying for their cost—i.e., to formulate a distributed algorithm that handles the enforcement of these constraints.

Herein, Problem 1 is reformulated into a consensus optimization form to enable the problem to be solved in a distributed fashion. Refer to the Brief Overview of Consensus Optimization above. First, local beliefs are introduced at each SRV regarding its location, the location of its neighboring SRVs (i.e., $\mathcal{D}_i$), and the locations of its assigned LVs (i.e., $\mathcal{L}_i$). In particular, the local decision variable at vehicle i∈ $\mathcal{S}$ is expressed as follows:

$$x_i = \left[x_{ii}^T, [x_{ij}]_{j\in\mathcal{D}_i}^T, [x_{i\ell}]_{\ell\in\mathcal{L}_i}^T\right]^T,$$

where $x_{ii}$ represents the local belief vehicle i has regarding its own location, while $x_{ij}$ and $x_{i\ell}$ are the local beliefs of vehicle i regarding the location of vehicles j∈ $\mathcal{D}_i$ and $\ell \in \mathcal{L}_i$, respectively. A distributed variant of Problem 1 can then be formulated as "Problem 4":

$$\min_x \sum_{i\in\mathcal{S}} f_i(x_i)$$

s.t.
C1: $\|x_{ii}-c_{ij}\|\leq b_{ij}$, j∈ $\mathcal{O}_i$
  $\|x_{i\ell}-c_{\ell q}\|\leq b_{\ell q}$, $\ell\in\mathcal{L}_i$, q∈ $\mathcal{Q}_i$
C2: $x_{ii}\in\mathcal{R}_i$
C3: $|x_{ij,e}+d_{ij}\cos(\phi_{ij})-x_{ii,e}|\leq a_{ij}^e$, j∈ $\mathcal{D}_i$
  $|x_{ij,n}+d_{ij}\sin(\phi_{ij})-x_{ii,n}|\leq a_{ij}^n$, j∈ $\mathcal{D}_i$
  $|x_{iq,e}+d_{\ell q}\cos(\phi_{\ell q})-x_{i\ell,e}|\leq a_{\ell q}^e$, $\ell\in\mathcal{L}_i$, q∈ $\mathcal{Q}_{i\ell}$
  $|x_{iq,n}+d_{\ell q}\sin(\phi_{\ell q})-x_{i\ell,n}|\leq a_{\ell q}^n$, $\ell\in\mathcal{L}_i$, q∈ $\mathcal{Q}_{i\ell}$
C4: $x_{ij}=x_{jj}$, j∈ $\mathcal{D}_i$, where all constraints are enforced for every i∈ $\mathcal{S}$, x= $[x_i]_{i\in\mathcal{S}}$, and $\mathcal{Q}_{i\ell}= \mathcal{D}_{\ell_i}\cap\mathcal{O}\cup\{\ell\}$. In addition, for each i∈ $\mathcal{S}$, $$f_i(x_i) = \sum_{j\in\mathcal{O}_i} w_{ij}\|x_{ii}-c_{ij}\|^2 + \sum_{\substack{\ell\in\mathcal{L}_i,\\ q\in\mathcal{Q}_{i\ell}}} w_{\ell q}\|x_{i\ell}-c_{\ell q}\|^2.$$

The main idea underlying the distributed solution of the localization problem is introducing the local beliefs an SRV has regarding its surroundings. These local beliefs are optimized locally at each SRV, where the measurement-consistency constraints (i.e., constraints set C3) in Problem 4 are enforced locally at each vehicle rather than globally, as in the solution of Problem 1. The consensus constraint C4 acts as a correction to the local belief an SRV has regarding the location of other vehicles in the scene. In other words, the solution maintains consistency between beliefs at each SRV regarding its own location and that at its neighbors regarding its location. Though the measurement consistency constraints are locally handled, the consensus constraints are still the reason for coupling local variables at different vehicles. The algorithm presented next to solve Problem 4 can handle this coupling via V2V communication between neighboring SRVs.

Consensus Distributed Optimization Algorithm

In one embodiment, optimization module 240 executes the following algorithm ("Algorithm 1"):

---

Algorithm 1: Distributed Localization $\{\alpha_i, \gamma_i\}_{i\in\mathcal{S}}$ 1  Initialize $x_i^0$, $s_i^0$, and $p_i^0$ $\forall i \in \mathcal{S}$
2  for k ≥ 0 and each i ∈ $\mathcal{S}$ do
3  | Updating local belief:
   |
   | $\overline{x}_{ii}^k \leftarrow x_{ii}^k - \alpha_i\left[\sum_{j\in\mathcal{D}_i}(x_{ii}^k - c_{ij}) + s_{ii}^k + p_{ii}^k\right]$
   |
   | $\overline{x}_{ij}^k \leftarrow x_{ij}^k - \alpha_i[s_{ij}^k + p_{ij}^k]$, j ∈ $\mathcal{D}_i$
   |
   | $\overline{x}_{i\ell}^k \leftarrow x_{i\ell}^k - \alpha_i\left[\sum_{q\in\mathcal{Q}_{i\ell}}(x_{i\ell}^k - c_{\ell q})\right]$
4  | Projection onto local constraint set:
   | $\overline{x}_i^k \leftarrow \left[\overline{x}_{ii}^{k^T}, [\overline{x}_{ij}^k]_{j\in\mathcal{D}_i}^T, [\overline{x}_{i\ell}^k]_{\ell\in\mathcal{L}_i}^T\right]^T$
   | $x_i^{k+1} \leftarrow \Pi_{\mathcal{X}_i}(\overline{x}_i^k)$
5  | Communicating with neighboring SRV$_s$:
   |
   | $s_{ii}^{k+1} \leftarrow \sum_{j\in\mathcal{O}_i}\Gamma_{ij}x_{ji}^{k+1}$
   |
   | $s_{ij}^{k+1} \leftarrow \Gamma_{ij}(x_{ii}^{k+1} - x_{ij}^{k+1})$, j ∈ $\mathcal{D}_i$
   | $s_i^{k+1} \leftarrow [s_{ij}^{k+1}]_{j\in\mathcal{O}_i}$
6  | Updating auxiliary variables:
   | $p_i^{k+1} \leftarrow p_i^k + s_i^{k+1}$

---

For simplicity, all of the constraints handled locally by SRV i∈ $\mathcal{S}$ are grouped into a constraint set $\mathcal{X}_i$. More precisely, $\mathcal{X}_1$ is the set of all possible values of decision variable $x_i$ of vehicle i∈ $\mathcal{S}$ that satisfies all constraints in Problem 4 for that vehicle except the consensus constraints. Hence, Problem 4 can be rewritten as follows ("Problem 5"):

$$\min_x \sum_{i\in\mathcal{S}} [f_i(x_i) + 1_{\mathcal{X}_i}(x_i)]$$

s.t. $x_{ij} = x_{jj}$, i ∈ $\mathcal{S}$, j ∈ $\mathcal{D}_i$, where $f_i(x_i)$ is as defined above, and $1_{\mathcal{X}_i}(x_i)$ is the indicator function to the set $\mathcal{X}_1$ that is zero if $x_i \in \mathcal{X}_1$ and is $+\infty$ otherwise. An SRV updates its variable $x_i$ by taking a gradient-like step with respect to the local cost function $f_i$, computing a projection onto the local constraint set $\mathcal{X}_i$, then communicating the decision to the neighboring SRVs. Algorithm 1 outlines a solution for Problem 5, where the superscript k refers to the iteration index.

Define $\Gamma\in\mathbb{R}^{|\mathcal{S}|\times|\mathcal{S}|}$ such that for each i∈ $\mathcal{S}$, $\Gamma_{ij}=0$ for j∉ $\mathcal{D}_i$, $$\Gamma_{ij} = -\frac{\gamma_i\gamma_j}{\gamma_i+\gamma_j}$$

for j∈ $\mathcal{D}_i$, and $$\Gamma_{ii} = \sum_{j\in\mathcal{D}_i}\frac{\gamma_i\gamma_j}{\gamma_i+\gamma_j},$$

with a scalar parameter $\gamma_i > 0$ for each $i \in \mathcal{S}$. Moreover, the algorithm introduces auxiliar variables $s_i = [s_{ij}]_{j \in \mathcal{O}_i}$ and $p_i = [p_{ij}]_{j \in \mathcal{O}_i}$ that handle the consensus constraints and their corresponding dual variable updates. Note that $s_i, p_i \in \mathbb{R}^{2|\mathcal{O}_i|}$. The variable $s_i$ is responsible for fusing the beliefs regarding the location of vehicle i collected from the SRVs that can detect that vehicle.

GPS measurements can be used to initialize location estimates, i.e., $x_{ii}^0 = c_{ii}$, and $x_{ij}^0 = c_{ij}$ for $j \in \mathcal{D}_i \cup \mathcal{L}_i$. The variable $s_i$ is initialized accordingly. That is, $s_{ii}^0 = \sum_{j \in \mathcal{O}_i} \Gamma_{ij} x_{ji}^0$ and $s_{ij}^0 = \Gamma_{ij}(x_{ij}^0 - x_{ij}^0)$ for each $j \in \mathcal{D}_i$. On the other hand, the variable $p_i$ is initialized to the all-zero vector 0.

The SRV $i \in \mathcal{S}$ updates its local variable $x_i$ as follows:

$$x_i^{k+1} \leftarrow \Pi_{\mathcal{X}_i}\left(x_i^k - \alpha_i\left[\nabla f_i(x_i^k) + \begin{bmatrix} s_i^k \\ 0 \end{bmatrix} + \begin{bmatrix} p_i^k \\ 0 \end{bmatrix}\right]\right),$$

Where $\alpha_1 > 0$ is a gradient step-size parameter, and $\Pi_{\mathcal{X}_i}(\cdot)$ denotes the Euclidian projection onto the set $\mathcal{X}_i$. In particular, $\Pi_{\mathcal{X}_i}(\bar{x}_i) = \operatorname{argmin}\{\|x_i - \bar{x}_i\| : x_i \in \mathcal{X}_i\}$. A round of communication is then performed between neighboring SRVs. In further detail, the kth iteration of Algorithm 1 for SRV $i \in \mathcal{S}$ consists of the following main steps. In Step 4, the variable $x_i$ is updated locally by solving a simple projection problem onto the set of local constraints. In Step 5, the SRV exchanges its current local beliefs with interested neighboring SRVs. More precisely, it broadcasts $x_{ii}^{k+1}$ to all $j \in \mathcal{D}_i$, sends $x_{ij}^{k+1}$ to vehicle $j \in \mathcal{D}_i$, and receives $x_{ji}^{k+1}$ from vehicle $j \in \mathcal{D}_i$. These beliefs are then fused using the mixing weight parameters defined in $\Gamma$. The solution described above enables SRVs to cooperate with LVs and solve the localization optimization problem in a distributed manner by performing local computations at SRVs and V2V communication among neighboring SRVs.

As discussed above, the distributed localization Algorithm 1 proceeds iteratively until predetermined convergence criteria for the estimated locations of the participating vehicles have been satisfied. In some embodiments, once an SRV has solved its local optimization problem, a final confidence level can be assigned to the output solution. Each SRV receives, essentially, a probability distribution for its own position in the form of measurements/estimates from one or more other SRVs.

Alternative Embodiment: Iterated Fusion

In an alternative distributed solution to the optimization problem termed "iterated fusion" herein, optimization module 240 does not enforce the constraints C3 in solving Problem 1, but, rather, optimization module 240 uses them in a different way. In the first phase, Problem 1 is solved, taking out constraints C3, by distributing the computations among all SRVs. Once each SRV has solved its problem, that SRV receives a better estimate of its own location, since it just fused the location estimates it received from all vehicles that could detect it. This new location estimate also comes with an associated confidence level as part of the optimization problem. A vehicle utilizes this new estimate of its own location alongside the relative distance and angle measurements it had captured related to other vehicles to send to them a "corrected" estimate of their locations, along with a modified confidence level. Once this round of communication has been completed, each SRV again locally solves a fusion problem based on the newly available information, with their weights set accordingly (i.e., in accordance with the latest confidence levels). In summary, the alternative algorithm involves the following two-step process: (1) an acquisition phase, in which each SRV fuses information independently; and (ii) a correction phase, in which new location estimates, utilizing the previously captured relative distance and angle measurements and the newly available location local to each vehicle, are exchanged. Then, another round of fusion similar to Step (1) takes place. The algorithm is executed iteratively until predetermined convergence criteria for the estimates locations of the participating vehicles have been satisfied, as discussed above.

Method Flowchart

Figure 7:
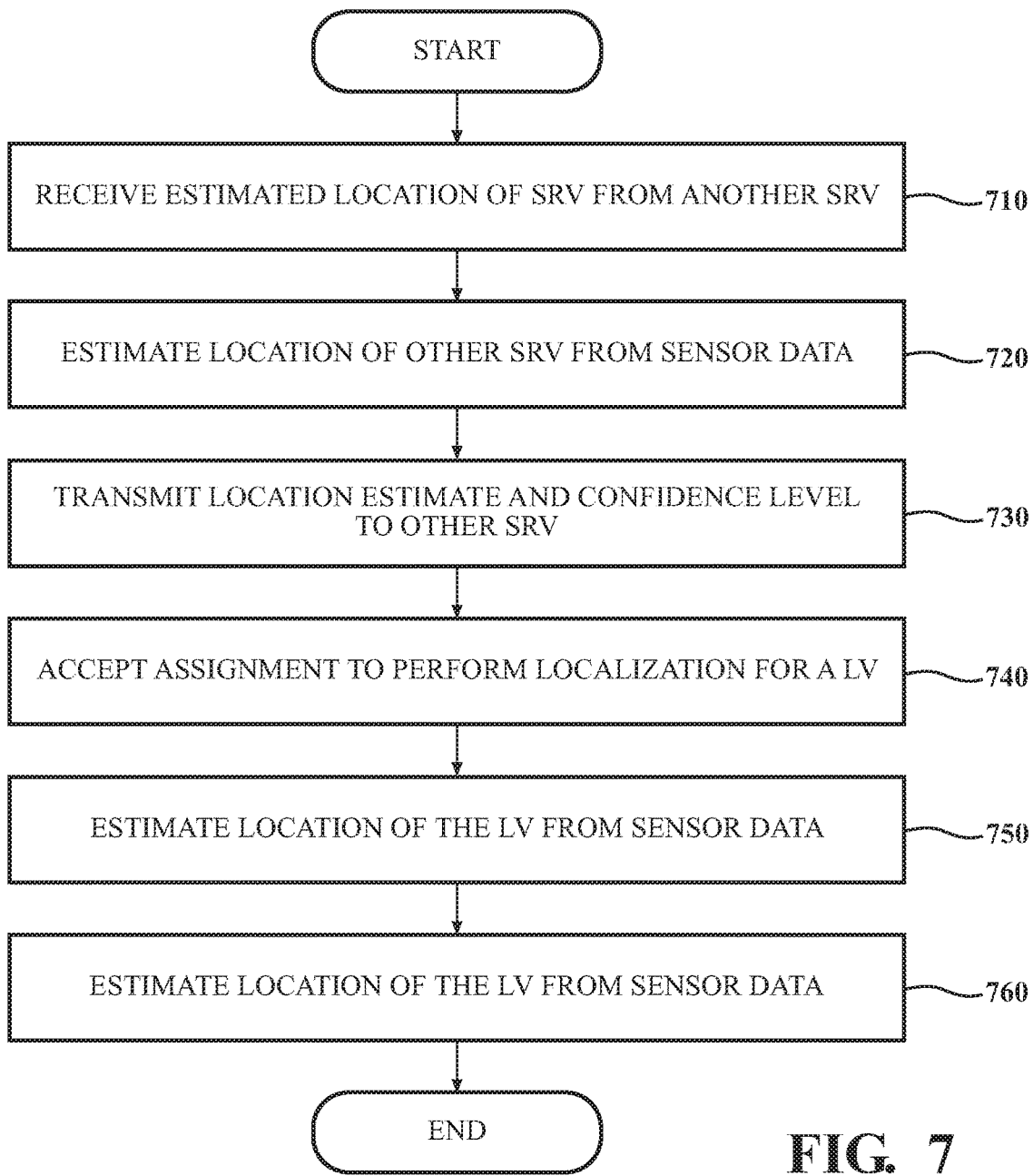
FIG. 7 is a flowchart of a method of distributed cooperative localization in a connected vehicular platform, in accordance with an illustrative embodiment of the invention.

FIG. 7 is a flowchart of a method of distributed cooperative localization in a connected vehicular platform, in accordance with an illustrative embodiment of the invention. Method 700 will be discussed from the perspective of the distributed cooperative localization system 170 shown in FIG. 2. While method 700 is discussed in combination with distributed cooperative localization system 170, it should be appreciated that method 700 is not limited to being implemented within distributed cooperative localization system 170, but distributed cooperative localization system 170 is instead one example of a system that may implement method 700.

At block 710, sensor-rich-vehicle interaction module 220 of a distributed cooperative localization system 170 in a first SRV receives, from a second SRV with which the first SRV is in direct V2V communication, an estimated location of the first SRV and a confidence level associated with the estimated location of the first SRV. As discussed above, in one embodiment, the second SRV assigns a confidence level to the estimated location of the first SRV based on factors such as the distance between the first and second SRVs, environmental conditions (e.g., weather), the type and quality of the environmental sensors with which the second SRV is equipped, and other factors. The confidence level associated with the estimated location of the first SRV permits optimization module 240 to assign a weight to the estimated location of the first SRV in connection with a distributed optimization algorithm that accurately estimates the location of each vehicle in a group of networked vehicles.

At block 720, sensor-rich-vehicle interaction module 220 estimates the location of the second SRV based on sensor data 260 obtained from one or more vehicular sensors and assigns a confidence level to the estimated location of the second SRV. As discussed above, a SRV includes sensors such as cameras 126, LIDAR sensors 124, radar sensors 123, and/or sonar sensors 125. As those skilled in the art area aware, LIDAR sensors 124, radar sensors 123, and sonar sensors 125 are particularly useful for ranging measurements—measuring the distance from a SRV to another vehicle or other object in the environment. In this embodiment, the first SRV assigns a confidence level to the estimated location of the second SRV based on one or more of the factors discussed above.

At block 730, sensor-rich-vehicle interaction module 220 transmits, to the second SRV via direct V2V communication, the estimated location of the second SRV and the confidence level assigned to the estimated location of the second SRV. As discussed above, at this point, the first and second SRVs have exchanged with each other, via V2V communication, an estimate of each other's location. As discussed above, this process can be repeated iteratively until the location estimates for the participating vehicles converge in accordance with predetermined convergence criteria.

At block 740, legacy-vehicle interaction module 230 of a distributed cooperative localization system 170 in a first SRV (e.g., SRV 100 discussed above) accepts, based on communication between the first and second SRVs and predetermined acceptance criteria, an assignment to perform localization for a LV. In some embodiments, the SRVs in a group of networked vehicles negotiate among themselves to decide which SRV should take the assignment to perform localization for a particular LV in the group (i.e., to estimate the position of the particular LV to provide more accurate location information to the LV than the LV can obtain from its own onboard GPS unit). The negotiation process can involve one or more V2V messages communicated among two or more candidate SRVs. The predetermined acceptance criteria are discussed above.

At block 750, legacy-vehicle interaction module 230 estimates the location of the subject LV based on sensor data 260 from one or more sensors installed on the first SRV. For example, legacy-vehicle interaction module 230 can use ranging (distance) data obtained from one or one or more LIDAR sensors 124, one or more radar sensors 123, and/or one or more sonar sensors 125 in combination with other data (e.g., image data from one or more cameras 126, the first SRV's own localization data, GPS data, etc.) to estimate the location (e.g., coordinates) of the subject LV.

At block 760, legacy-vehicle interaction module 230 transmits, to the subject LV, the estimated location of the subject LV. In some embodiments, the first SRV transmits the estimated location of the subject LV to the subject LV via a direct V2V connection. In other embodiments, this is accomplished via a cellular data network.

In some embodiments, method 700 includes additional actions not shown in FIG. 7. More specifically, in one embodiment, legacy-vehicle interaction module 230 of a distributed cooperative localization system 170 in a first SRV (e.g., SRV 100 discussed above) receives, from the subject LV discussed above, location information (e.g., GPS coordinates) for the subject LV. In the larger distributed optimization problem involving multiple networked vehicles discussed above, the GPS-based location information reported by a LV to one or more SRVs can be considered along with other location data (e.g., location measurements from one or more SRVs). In some embodiments, the LV assigns a confidence level to the reported location data. For example, some GPS units generate a confidence level for the position data they output. The LV can report the confidence level to one or more SRVs in addition to the LV's location information itself. Especially when an iterative optimization process is executed to the point of convergence, as discussed above, the estimated location of a LV transmitted to the LV by a SRV is more accurate than the location information for the LV (e.g., GPS coordinates from the LV's GPS unit) received from the LV at a SRV.

FIG. 1 will now be discussed in full detail as an example vehicle environment within which the systems and methods disclosed herein may be implemented. The SRV 100 can include one or more processors 110. In one or more arrangements, the one or more processors 110 can be a main processor of the SRV 100. For instance, the one or more processors 110 can be an electronic control unit (ECU). The SRV 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the SRV 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, SRV 100 can receive sensor data from other connected vehicles, from devices associated with other road users (ORUs), or both.

As noted above, the SRV 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the SRV 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the SRV 100 itself, including the operational status of various vehicle components and systems.

In one or more arrangements, the vehicle sensors 121 can be configured to detect, and/or sense position and/orientation changes of the SRV 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a navigation system 147, and/or other suitable sensors. The vehicle sensors 121 can be configured to detect, and/or sense one or more characteristics of the SRV 100. In one or more arrangements, the vehicle sensors 121 can include a speedometer to determine a current speed of the SRV 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the SRV 100 and/or information/data about such obstacles. The one or more environment sensors 122 can be configured to detect, measure, quantify, and/or sense other things in at least a portion the external environment of the SRV 100, such as, for example, nearby vehicles, lane markers, signs, traffic lights, traffic signs, lane lines, crosswalks, curbs proximate the SRV 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the SRV 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The SRV 100 can further include a communication system 130. The communication system 130 can include one or more components configured to facilitate communication between the SRV 100 and one or more communication sources. Communication sources, as used herein, refers to people or devices with which the SRV 100 can communicate with, such as external networks, computing devices, operator or occupants of the SRV 100, or others. As part of the communication system 130, the SRV 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The SRV 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The SRV 100 can include one or more vehicle systems 140. Various examples of the one or more vehicle systems 140 are shown in FIG. 1. However, the SRV 100 can include more, fewer, or different vehicle systems. It should be appreciated that although particular vehicle systems are separately defined, each or any of the systems or portions thereof may be otherwise combined or segregated via hardware and/or software within the SRV 100. The SRV 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 can be operatively connected to communicate with the various vehicle systems 140 and/or individual components thereof. For example, returning to FIG. 1, the one or more processors 110 can be in communication to send and/or receive information from the various vehicle systems 140 to control the movement, speed, maneuvering, heading, direction, etc. of the SRV 100. The one or more processors 110 may control some or all of these vehicle systems 140.

The SRV 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for distributed cooperative localization in a connected vehicular platform, the system comprising:
   one or more sensors installed on a first sensor-rich vehicle;
   one or more processors in the first sensor-rich vehicle; and
   a memory in the first sensor-rich vehicle communicably coupled to the one or more processors and storing:
   a first plurality of instructions that when executed by the one or more processors cause the one or more processors to:
   receive, from a second sensor-rich vehicle with which the first sensor-rich vehicle is in direct vehicle-to-vehicle (V2V) communication, an estimated location of the first sensor-rich vehicle and a first confidence level associated with the estimated location of the first sensor-rich vehicle;
   estimate a location of the second sensor-rich vehicle based on first sensor data from the one or more sensors and assign a second confidence level to the estimated location of the second sensor-rich vehicle;
   transmit, to the second sensor-rich vehicle via direct V2V communication, the estimated location of the second sensor-rich vehicle and the second confidence level assigned to the estimated location of the second sensor-rich vehicle; and
   a second plurality of instructions that when executed by the one or more processors cause the one or more processors to:
   accept, based on communication between the first and second sensor-rich vehicles and predetermined acceptance criteria, an assignment to perform localization for a legacy vehicle;
   estimate a location of the legacy vehicle based on second sensor data from the one or more sensors; and
   transmit, to the legacy vehicle, the estimated location of the legacy vehicle.

2. The system of claim 1, wherein the predetermined acceptance criteria include at least one of (1) how many other sensor-rich vehicles with which the first sensor-rich vehicle is in direct communication are also in communication with the legacy vehicle and (2) a current computational load of the first sensor-rich vehicle.

3. The system of claim 1, wherein the communication between the first and second sensor-rich vehicles includes negotiation regarding whether the first sensor-rich vehicle will accept the assignment to perform localization for the legacy vehicle.

4. The system of claim 1, wherein the second plurality of instructions cause the one or more processors to:
   receive, from the legacy vehicle, location information for the legacy vehicle;
   wherein the estimated location of the legacy vehicle transmitted to the legacy vehicle is more accurate than the location information for the legacy vehicle received from the legacy vehicle.

5. The system of claim 1, wherein the one or more sensors installed on the first sensor-rich vehicle include one or more of cameras, Light Detection and Ranging (LIDAR) sensors, radar sensors, and sonar sensors and the legacy vehicle is equipped with a Global Positioning System (GPS) unit to produce location information for the legacy vehicle.

6. The system of claim 1, further comprising a third plurality of instructions that when executed by the one or more processors cause the one or more processors to assign a weight to the estimated location of the first sensor-rich vehicle based, at least in part, on the first confidence level associated with the estimated location of the first sensor-rich vehicle.

7. The system of claim 6, wherein the third plurality of instructions, when executed by the one or more processors, cause the one or more processors to execute iteratively the first plurality of instructions and the second plurality of instructions in accordance with an optimization algorithm until predetermined convergence criteria have been satisfied with respect to the estimated location of the first sensor-rich vehicle, the estimated location of the second sensor-rich vehicle, and the estimated location of the legacy vehicle.

8. The system of claim 7, wherein the optimization algorithm includes one of consensus distributed optimization and iterated fusion and the optimization algorithm includes modeling of ranging-sensor errors.

9. A non-transitory computer-readable medium for distributed cooperative localization in a connected vehicular platform and storing instructions that when executed by one or more processors cause the one or more processors to:
   receive, at a first sensor-rich vehicle from a second sensor-rich vehicle with which the first sensor-rich vehicle is in direct vehicle-to-vehicle (V2V) communication, an estimated location of the first sensor-rich vehicle and a first confidence level associated with the estimated location of the first sensor-rich vehicle;

estimate, at the first sensor-rich vehicle, a location of the second sensor-rich vehicle based on first sensor data and assigning, at the first sensor-rich vehicle, a second confidence level to the estimated location of the second sensor-rich vehicle;

transmit, from the first sensor-rich vehicle to the second sensor-rich vehicle via direct V2V communication, the estimated location of the second sensor-rich vehicle and the second confidence level assigned to the estimated location of the second sensor-rich vehicle;

accept, at the first sensor-rich vehicle based on communication between the first and second sensor-rich vehicles and predetermined acceptance criteria, an assignment to perform localization for a legacy vehicle;

estimate, at the first sensor-rich vehicle, a location of the legacy vehicle based on second sensor data; and transmit, from the first sensor-rich vehicle to the legacy vehicle, the estimated location of the legacy vehicle.

10. The non-transitory computer-readable medium of claim 9, wherein the predetermined acceptance criteria include at least one of (1) how many other sensor-rich vehicles with which the first sensor-rich vehicle is in direct communication are also in communication with the legacy vehicle and (2) a current computational load of the first sensor-rich vehicle.

11. The non-transitory computer-readable medium of claim 9, wherein the communication between the first and second sensor-rich vehicles includes negotiation regarding whether the first sensor-rich vehicle will accept the assignment to perform localization for the legacy vehicle.

12. The non-transitory computer-readable medium of claim 9, wherein the instructions, when executed by one or more processors, cause the one or more processors to:
receive, at the first sensor-rich vehicle from the legacy vehicle, location information for the legacy vehicle;
wherein the estimated location of the legacy vehicle is more accurate than the location information for the legacy vehicle received from the legacy vehicle.

13. The non-transitory computer-readable medium of claim 9, wherein the instructions, when executed by the one or more processors, cause the one or more processors to execute iteratively the instructions stored in the non-transitory computer-readable medium in accordance with an optimization algorithm until predetermined convergence criteria have been satisfied with respect to the estimated location of the first sensor-rich vehicle, the estimated location of the second sensor-rich vehicle, and the estimated location of the legacy vehicle.

14. A method of distributed cooperative localization in a connected vehicular platform, the method comprising:
receiving, at a first sensor-rich vehicle from a second sensor-rich vehicle with which the first sensor-rich vehicle is in direct vehicle-to-vehicle (V2V) communication, an estimated location of the first sensor-rich vehicle and a first confidence level associated with the estimated location of the first sensor-rich vehicle;

estimating, at the first sensor-rich vehicle, a location of the second sensor-rich vehicle based on first sensor data and assigning, at the first sensor-rich vehicle, a second confidence level to the estimated location of the second sensor-rich vehicle;

transmitting, from the first sensor-rich vehicle to the second sensor-rich vehicle via direct V2V communication, the estimated location of the second sensor-rich vehicle and the second confidence level assigned to the estimated location of the second sensor-rich vehicle;

accepting, at the first sensor-rich vehicle based on communication between the first and second sensor-rich vehicles and predetermined acceptance criteria, an assignment to perform localization for a legacy vehicle;

estimating, at the first sensor-rich vehicle, a location of the legacy vehicle based on second sensor data; and transmitting, from the first sensor-rich vehicle to the legacy vehicle, the estimated location of the legacy vehicle.

15. The method of claim 14, wherein the predetermined acceptance criteria include at least one of (1) how many other sensor-rich vehicles with which the first sensor-rich vehicle is in direct communication are also in communication with the legacy vehicle and (2) a current computational load of the first sensor-rich vehicle.

16. The method of claim 14, wherein the communication between the first and second sensor-rich vehicles includes negotiation regarding whether the first sensor-rich vehicle will accept the assignment to perform localization for the legacy vehicle.

17. The method of claim 14, further comprising:
receiving, at the first sensor-rich vehicle from the legacy vehicle, location information for the legacy vehicle;
wherein the estimated location of the legacy vehicle transmitted to the legacy vehicle is more accurate than the location information for the legacy vehicle received from the legacy vehicle.

18. The method of claim 14, further comprising assigning, at the first sensor-rich vehicle, a weight to the estimated location of the first sensor-rich vehicle based, at least in part, on the first confidence level associated with the estimated location of the first sensor-rich vehicle.

19. The method of claim 14, wherein the method is performed iteratively in accordance with an optimization algorithm until predetermined convergence criteria have been satisfied with respect to the estimated location of the first sensor-rich vehicle, the estimated location of the second sensor-rich vehicle, and the estimated location of the legacy vehicle.

20. The method of claim 19, wherein the optimization algorithm includes one of consensus distributed optimization and iterated fusion and the optimization algorithm includes modeling of ranging-sensor errors.

* * * * *